Aug. 5, 1958    H. L. THOLSTRUP    2,846,216

GATE TAPE GUIDE DEVICE

Filed Aug. 25, 1955    3 Sheets-Sheet 1

INVENTOR
HENRY L. THOLSTRUP
BY George Sipkin
Reed Huntberger
ATTORNEYS

Aug. 5, 1958 H. L. THOLSTRUP 2,846,216

GATE TAPE GUIDE DEVICE

Filed Aug. 25, 1955 3 Sheets-Sheet 2

INVENTOR
HENRY L. THOLSTRUP
BY George Sipkin
Fred. Huntzberger
ATTORNEYS

Aug. 5, 1958 H. L. THOLSTRUP 2,846,216

GATE TAPE GUIDE DEVICE

Filed Aug. 25, 1955 3 Sheets-Sheet 3

INVENTOR
HENRY L. THOLSTRUP
BY George Lipkin
Leo. Huntzberger
ATTORNEYS

United States Patent Office 2,846,216
Patented Aug. 5, 1958

2,846,216

GATE TAPE GUIDE DEVICE

Henry L. Tholstrup, Rochester, N. Y., assignor, by mesne assignments, to the United States of America as represented by the Secretary of the Navy Application August 25, 1955, Serial No. 530,652

8 Claims. (Cl. 271—2.3)

This invention relates to a tape guide device for use with apparatus employing perforated tape and having tape feed means, and more patricularly, to a gate tape guide device for directing the tape in contact with and beyond the tape feed means.

The use of a tape guide device in apparatus employing perforated tape and having tape feed means is well known in the art, and is shown for instance, in Fig. 7 of my Patent No. 2,436,126. In the past, as illustrated in Fig. 7 of my above identified patent, the tape guide device provided a fixed guide path for the tape. With such a fixed guide device it is difficult and inconvenient to thread a new tape therethrough and to align the threaded tape on the tape feed means.

It is an object of this invention to provide an improved tape guide device incorporating a large tape gate.

It is a more specific object of this invention to provide an improved tape guide device incorporating a large tape gate which acts to hold the tape on the tape feed means and as a guide path when the gate is closed, and which allows easy threading of a new tape when the gate is open.

Other objects and many of the attendant advantages of this invention will be readily appreciated as the same becomes better understood by reference to the following detailed description when considered in connection with the accompanying drawings wherein.

Figure 1:
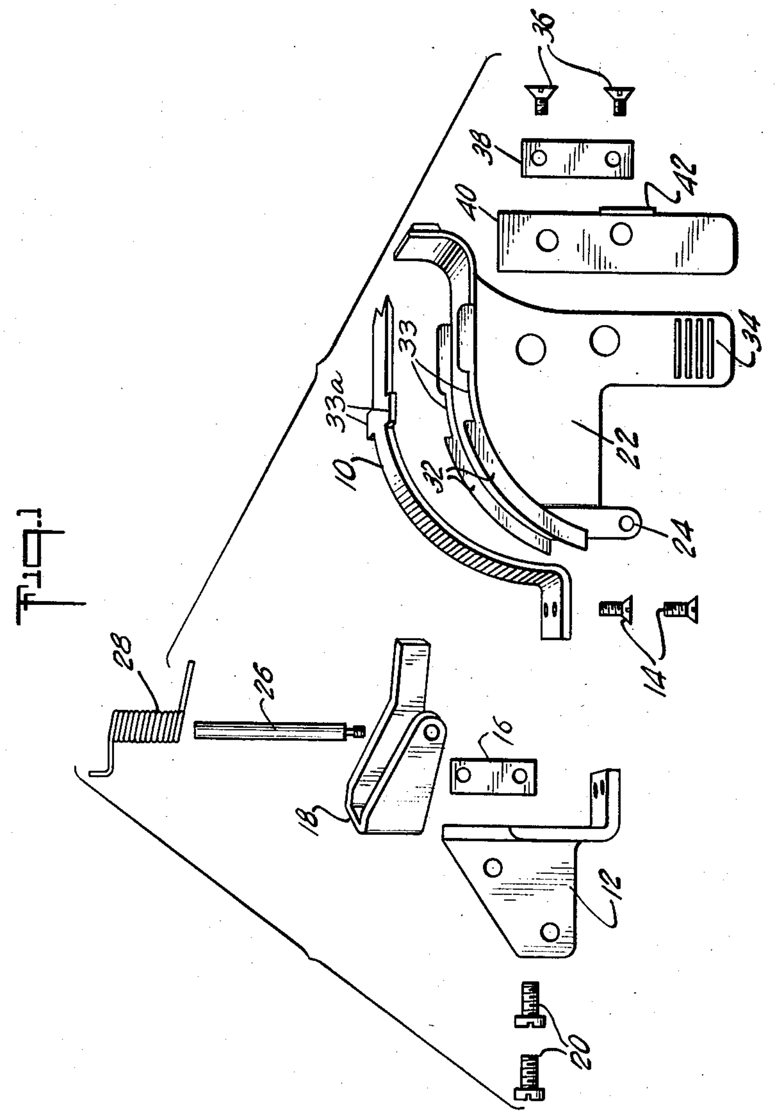
Fig. 1 is an exploded view of the components of the gate tape guide.

Referring now to Figs. 1 to 4, inclusive, the gate tape guide consists of a first element 10 having a cylindrically concave surface. Element 10 is fixedly secured to bracket 12 by means of screws 14 and nut 16. Also secured to bracket 12 is hinge 18. This is accomplished by means of screws 20. Bracket 12 is adapted to be fixedly secured to the base of the perforated tape apparatus. Therefore, bracket 12, first element 10 and hinge 18 are all in fixed relationship with respect to the chassis of the perforated tape apparatus.

Figure 2:
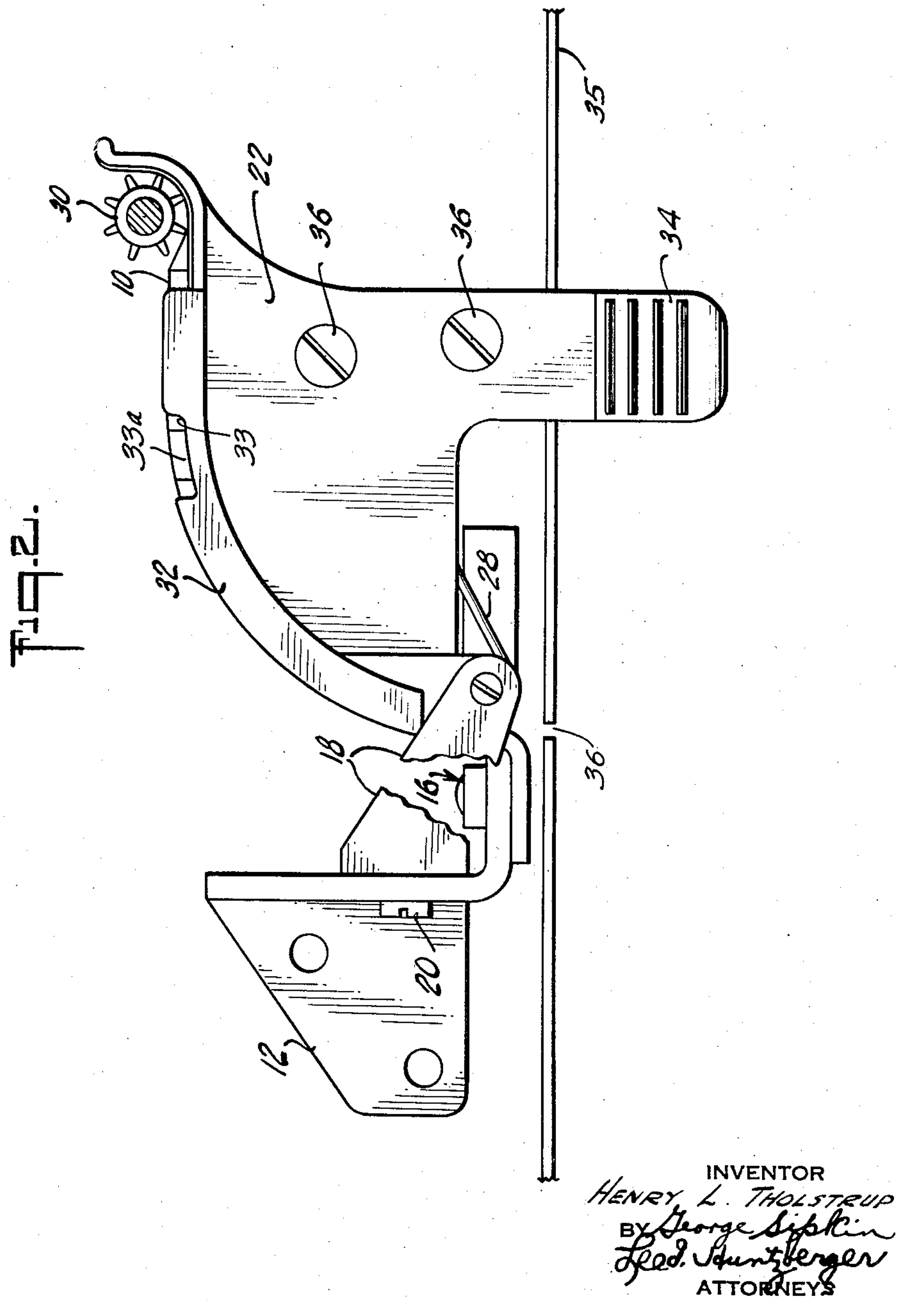
Fig. 2 is a plan view, partly in section, of the assembled gate tape guide together with the tape feed means and the front face plate of the perforated tape apparatus.
Figure 3:
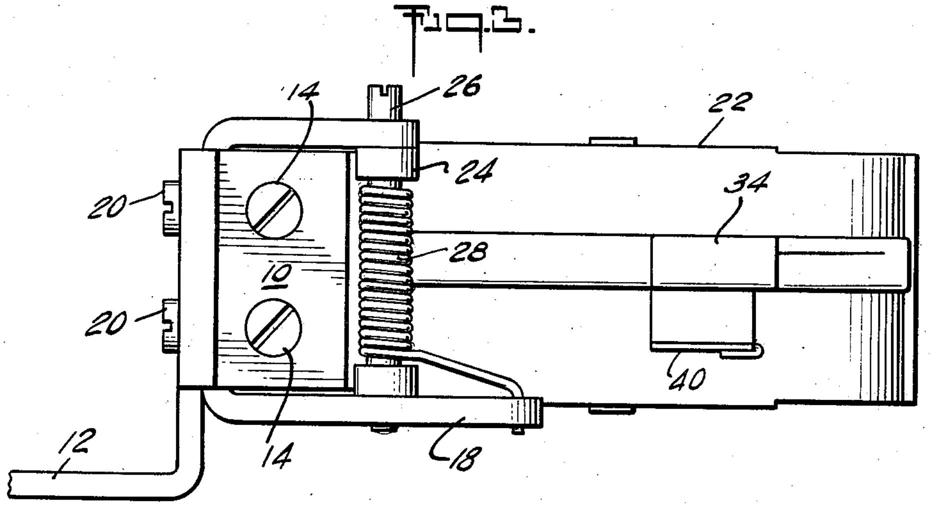
Fig. 3 is a front elevation view of the assembled gate tape guide shown in Fig. 2.

Gate element 22 includes coupling arms 24 integral therewith at one end thereof. Coupling arms 24 are pivotally mounted to hinge 18 by means of post 26 and torsion spring 28. Gate element 22 includes a convex surface corresponding in configuration to the concave surface of first element 10 which is normally maintained in cooperative relationship with this concave surface of element 10 by means of torsion spring 28. At the end of the convex surface of gate element 22 remote from coupling arms 24 gate element 22 includes a cylindrical concave surface which is adapted to partially surround tape feed means 30 (shown in Fig. 2). The convex surface of gate element 22 is bounded by rims 32 which overlap the side edges of first element 10 when gate element 22 is closed. The rims 32, intermediate of their ends, have notches 33 aligned with each other, and the first element 10 has lateral flanges or projections 33a that are received in the notches 33 when the gate element 22 is in cooperative relationship to element 10 as shown in Fig. 2. The projections 33a, by their engagement with the bottoms of notches 33, limit movement of the gate element 22 towards element 10 under the action of spring 28 and spaces apart the concave surface of element 10 and the convex surface of gate 22 to provide an arcuate channel through which the tape may slide freely, without binding.

Figure 4:
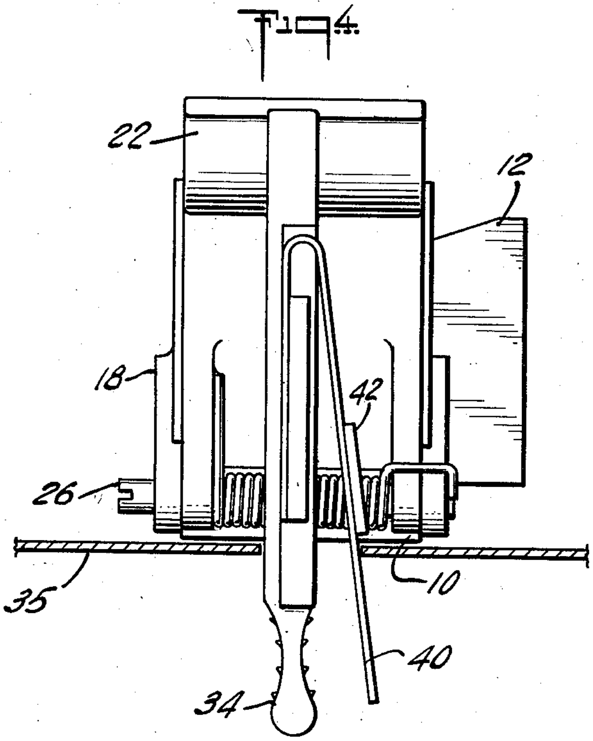
Fig. 4 is a side elevation view of the gate tape guide shown in Fig. 2 together with the front face plate of the perforated tape apparatus.

Gate element 22 further includes a longitudinal arm 34 forming a handle which passes through an opening in front face plate 35, Fig. 4. Connected to handle 34 by means of screws 36 and nut 38 is latch member 40. Latch member 40 is composed of resilient material formed into a folded piece of flat strip. The leg of latch member 40 which is not directly connected to handle 34 also passes through the opening in front face plate 35 and bears against the bottom portion thereof. This leg includes a projection 42 depending therefrom.

In operation, gate element 22 is opened by first pressing the free end of latch member 40 toward handle 34, so that depending projection 42 can pass through the opening in front face plate 35, and then pulling arm 34 outwardly through the opening in the face plate. After this is done the free end of latch member 40 is released, and since it is made of a resilient material it springs away from arm 34 and its projection 42 engages against the outside face of the front plate 35 and prevents the gate from closing. Gate element 22 tends to close under the urging of torsion spring 28, but is prevented from doing so by the inner end of projection 42 which is now outside of front face plate 35 and comes into contact with the face plate. The perforated tape is now threaded on to tape feed means 30 and the free end thereof placed in contact with the cylindrical surface of first element 10. The free end of latch member 40 is then pressed toward handle 34, which carries projection 42 out of its position where it prevents closing of the gate, and then under the urging of torsion spring 28 gate element 22 swings shut toward first element 10.

The tape is moved along the entire length of the concave and convex surfaces of first element 10 and gate element 22 respectively by tape feed means 30. A second opening 36 (Fig. 2) in front face plate 35 allows the free end of the tape, upon reaching the vicinity of hinge 18, to come therethrough.

Obviously many modifications and variations of the present invention are possible in the light of the above teachings. It is therefore to be understood that within the scope of the appended claims the invention may be practiced otherwise than as specifically described.

I claim:

1. In apparatus employing perforated tape and having tape feed means, a gate guide device for directing the tape in contact with and beyond said tape feed means; said device comprising a first element having a guide surface extending from one end thereof to the other end thereof, the width of said first element being in the order of the width of said tape, said element having said one end thereof fixedly secured to said apparatus and said other end thereof, free and extending tangentially toward but terminating in front of and near said tape feed means, a second element hinged at one end and having a guide surface which corresponds to the guide surface of said first element and at its free end having a cylindrically concave surface forming an extension of its said guide surface for extending partly around said feed means, said guide surface of said second element having a width in the order of the width of said tape, said second element being normally positioned with its guide surface thereof extending along and spaced slightly away from the corresponding guide surface of said first element, said hinge means including biased spring means urging said second element toward said first element, and handle means integral with said second element by which said second element may be moved away from said first element.

2. The device defined in claim 1, wherein said handle means includes a first longitudinal member lying in a plane perpendicular to the widths of said first and second elements, and wherein said apparatus includes a face plate oriented in a plane perpendicular to the length of said member when said second element is in its normal position, said plate having an opening therein through which said member passes, and wherein said handle means further includes a latch member composed of a folded flat strip of resilient material forming two legs, one of said legs being secured to said longitudinal member and the other of said legs passing through and tending to bear against the opening of said face plate, and a projection connected to said other of said legs intermediate the free end and the folded end thereof, said projection lying in a plane perpendicular to the plane of said other of said legs and having one dimension thereof parallel to the length of said other of said legs, said projection being positioned to be on the same side of said face plate as said first and second elements when said second element is in its normal position and to be on the other side of said face plate from said first and second elements when said second element is rotated away from said first element.

3. In an apparatus employing tape, a guide device comprising a fixed element and a gate element hinged to swing open and closed relative to said fixed element, said fixed element having a concave quadrant surface, said gate element having a corresponding convex quadrant surface and adapted in closed position to be spaced slightly from said concave surface to define a tape path therebetween, a pair of rims at the edges of said gate overlapping the edges of the fixed element in closed position fully to enclose said tape path, a pair of slots in said rims aligned transversely of the tape path, a transverse cross arm on said fixed element seating in said slots in closed position, said slots and cross arm serving to space said gate relative to said fixed element in closed position to define the tape path.

4. A tape feeding device comprising a rotatable sprocket wheel having peripherally arranged, radial teeth for engaging with apertures in a tape to feed the latter linearly, a support, a guide element fixed on said support and extending into proximity to said wheel and having a guide surface which at its end nearest the wheel, is approximately tangential to the wheel, a front plate, a gate element hinged to said support to swing toward and from said guide element and wheel, said gate element being yieldingly biased toward said guide element and having a guide surface facing and extending along said guide surface of said guide element, said gate element having its free end portion also extending beyond the end of said guide element and then arcuately partially around said sprocket wheel so as to confine the tape to the periphery of said wheel as it passes around it, said elements having cooperating parts engaging along a margin of said guide surfaces for limiting approach of the gate element toward the guide element and providing a minimum space between said guide surfaces in which the tape may freely slide, said gate element having an operating arm extending through said front plate for manipulation to draw said gate element away from said sprocket wheel and the guide element and facilitate insertion of a tape between the guide surfaces and partially around the sprocket wheel.

5. The device as set forth in claim 4, wherein said gate element has its margins along its guide surface flanged and extending past the corresponding side margins of the guide surface of said guide element for confining the tape against sidewise displacement from between the guide surfaces, said flanged margins having notches in their free edges, and said guide element having lateral projections received in said notches and with said flanged margins providing said engaging parts.

6. A tape feeding device comprising a rotatable sprocket wheel for feeding a tape linearly, a support, a guide element fixed on said support and extending along the path of tape feed up to but not past said wheel and having a guide surface for the tape that is approximately tangential to the periphery of said wheel, a gate element hinged to said support for pivotal movement toward and from said element and wheel and having a guide surface for the tape facing said guide surface on said element but extending to and partly around said wheel for confining said tape to said wheel, said gate element being resiliently biased toward said wheel, means limiting movement of said gate element toward said wheel and when the gate element is nearest said guide element providing a space between said guide surfaces in which said tape may freely slide, and a front plate having a passage, said gate element having an operating arm extending through said plate in said passage by which that element can be moved away from the guide element and wheel to facilitate removal or insertion of a tape between the guide surfaces.

7. The device as set forth in claim 6, wherein said operating arm has a latch member movable thereon, also extending through said plate in said passage, with a detent part engageable with the inside face of said front plate when the gate element is closed against said wheel and guide element to prevent an opening movement of said gate element, but operable into a position on the arm to pass through said plate in said passage with the arm and release the gate element for an opening movement, said detent part being also engageable with the outside face of said plate when the gate is opened, to releasably hold the gate in open position while the tape is being removed from or placed on said wheel.

8. The device as set forth in claim 7 wherein said latch member is a spring attached to said operating arm, has a free end extending along said arm through said passage in said plate, and the detent part is a lug on said spring.

References Cited in the file of this patent

UNITED STATES PATENTS

| | | |
|---|---|---|
| 1,882,014 | Howell | Oct. 11, 1932 |
| 1,991,870 | Schulz | Feb. 19, 1935 |
| 2,015,637 | Hanna | Sept. 24, 1935 |
| 2,232,811 | Sperry | Feb. 25, 1941 |